(12) United States Patent
Takacsi-Nagy et al.

(10) Patent No.: US 7,752,599 B2
(45) Date of Patent: Jul. 6, 2010

(54) SYSTEMS AND METHODS EXTENDING AN EXISTING PROGRAMMING LANGUAGE WITH CONSTRUCTS

(75) Inventors: Pal Takacsi-Nagy, Cupertino, CA (US); Michael Douglas Blow, San Jose, CA (US); Michael Blevins, Volcano, CA (US)

(73) Assignee: BEA Systems Inc., Redwood Shores, CA (US)

( * ) Notice: Subject to any disclaimer, the term of this patent is extended or adjusted under 35 U.S.C. 154(b) by 1170 days.

(21) Appl. No.: 10/784,374

(22) Filed: Feb. 23, 2004

(65) Prior Publication Data

US 2005/0010902 A1 Jan. 13, 2005

Related U.S. Application Data

(60) Provisional application No. 60/450,074, filed on Feb. 25, 2003.

(51) Int. Cl.
*G06F 9/44* (2006.01)
(52) U.S. Cl. ............................. 717/114; 717/116; 705/8
(58) Field of Classification Search ................. 717/108, 717/114; 705/8
See application file for complete search history.

(56) References Cited

U.S. PATENT DOCUMENTS

| 5,321,841 | A | 6/1994 | East et al. ................. 395/725 |
| 5,604,860 | A | 2/1997 | McLaughlin et al. | |
| 5,630,131 | A | 5/1997 | Palevich et al. | |
| 5,748,975 | A | 5/1998 | Van De Vanter ............ 395/793 |
| 5,801,958 | A | 9/1998 | Dangelo et al. | |

(Continued)

FOREIGN PATENT DOCUMENTS

CA  2248634  3/2000

(Continued)

OTHER PUBLICATIONS

G. Alonso et al., "Advanced Transaction Models in Workflow Contexts", Feb. 1996, Proceedings of 12th International Conference on Data Engineering, retrieved from: http://citeseer.ist.psu.edu/alonso96advanced.html.*

(Continued)

*Primary Examiner*—Lewis A Bullock, Jr.
*Assistant Examiner*—Jue Wang
(74) *Attorney, Agent, or Firm*—Fliesler Meyer LLP

(57) ABSTRACT

An easy-to-use workflow language can be created by extending an existing, common language such as JAVA. The language can be extended by adding those constructs that are missing but desirable. Such desirable constructs can include parallelism, asynchrony, loops over asynchronous events, and flexible handling of XML. Such constructs can allow a user to define a virtual program using the extended JAVA syntax. For example, XML can be placed inside a JAVA class that defines the high-level orchestration logic a workflow should follow. That orchestration logic can refer to the JAVA class to carry out work, such that the logic to handle an incoming message is really in JAVA. This description is not intended to be a complete description of, or limit the scope of, the invention. Other features, aspects, and objects of the invention can be obtained from a review of the specification, the figures, and the claims.

23 Claims, 3 Drawing Sheets

```
/**
 * @jwf:flow flow ::
 *
 * <process>
 *   <receive name="Receive employee info" method="start"/>
 *   <parallel join-condition="AND">
 *     <branch>
 *       <perform name="Request e-mail" method="reqMail"/>
 *       <receive name="Get e-mail" method="MIS_mailReady"/>
 *       <perform name="Notify client about e-mail"
 *           method="mailNotification"/>
 *     </branch>
 *     <branch>
 *       <perform name="Request benefits" method="reqBenefits"/>
 *       <receive name="Get benefits" method="hr_benefitsReady"/>
 *       <perform name="Notify client about benefits"
 *           method="benefitsNotification"/>
 *     </branch>
 *   </parallel> *   <perform name="Reply to requestor" method="end"/>
 * </process>
 * ::
 **/
```

U.S. PATENT DOCUMENTS

| | | | |
|---|---|---|---|
| 5,835,769 A | 11/1998 | Jervis et al. ............... 395/701 |
| 5,836,014 A | 11/1998 | Faiman |
| 5,867,822 A | 2/1999 | Sankar |
| 5,961,593 A | 10/1999 | Gabber et al. ............... 709/219 |
| 5,966,535 A | 10/1999 | Benedikt et al. |
| 6,012,083 A | 1/2000 | Savitzky et al. |
| 6,018,730 A | 1/2000 | Nichols et al. |
| 6,023,578 A | 2/2000 | Birsan et al. |
| 6,028,997 A | 2/2000 | Leymann et al. |
| 6,029,000 A | 2/2000 | Woolsey et al. |
| 6,044,217 A | 3/2000 | Brealey et al. ............... 395/701 |
| 6,067,548 A | 5/2000 | Cheng ............... 707/103 |
| 6,067,623 A | 5/2000 | Blakeley, III et al. ....... 713/204 |
| 6,070,184 A | 5/2000 | Blount et al. |
| 6,092,102 A | 7/2000 | Wagner |
| 6,119,149 A | 9/2000 | Notani ............... 709/205 |
| 6,141,701 A | 10/2000 | Whitney |
| 6,148,336 A | 11/2000 | Thomas et al. |
| 6,185,734 B1 | 2/2001 | Saboff et al. |
| 6,212,546 B1 | 4/2001 | Starkovich et al. |
| 6,222,533 B1 | 4/2001 | Notani et al. |
| 6,226,675 B1 | 5/2001 | Meltzer et al. ............... 709/223 |
| 6,230,287 B1 | 5/2001 | Pinard et al. ............... 714/31 |
| 6,230,309 B1 | 5/2001 | Turner et al. |
| 6,237,135 B1 | 5/2001 | Timbol |
| 6,243,737 B1 | 6/2001 | Flanagan et al. |
| 6,292,932 B1 | 9/2001 | Baisley et al. |
| 6,308,224 B1 * | 10/2001 | Leymann et al. ............... 719/310 |
| 6,311,327 B1 | 10/2001 | O'Brien et al. |
| 6,330,569 B1 | 12/2001 | Baisley et al. |
| 6,338,064 B1 | 1/2002 | Ault et al. ............... 707/9 |
| 6,343,265 B1 | 1/2002 | Glebov et al. |
| 6,353,923 B1 | 3/2002 | Bogel et al. ............... 717/4 |
| 6,367,068 B1 | 4/2002 | Vaidyanathan et al. |
| 6,377,939 B1 | 4/2002 | Young |
| 6,408,311 B1 | 6/2002 | Baisley et al. |
| 6,411,698 B1 | 6/2002 | Bauer et al. |
| 6,445,711 B1 | 9/2002 | Scheel et al. |
| 6,470,364 B1 | 10/2002 | Prinzing |
| 6,516,322 B1 * | 2/2003 | Meredith ............... 707/102 |
| 6,560,769 B1 | 5/2003 | Moore et al. |
| 6,567,738 B2 | 5/2003 | Gopp et al. |
| 6,594,693 B1 | 7/2003 | Borwankar ............... 709/219 |
| 6,594,700 B1 | 7/2003 | Graham et al. |
| 6,604,198 B1 | 8/2003 | Beckman et al. ............... 713/167 |
| 6,622,357 B2 | 9/2003 | Jackson et al. |
| 6,637,020 B1 | 10/2003 | Hammond |
| 6,643,652 B2 | 11/2003 | Helgeson et al. |
| 6,654,932 B1 | 11/2003 | Bahrs et al. |
| 6,678,518 B2 | 1/2004 | Eerola |
| 6,684,388 B1 | 1/2004 | Gupta et al. |
| 6,687,702 B2 | 2/2004 | Vaitheeswaran et al. |
| 6,687,848 B1 | 2/2004 | Najmi |
| 6,721,740 B1 | 4/2004 | Skinner et al. |
| 6,721,779 B1 | 4/2004 | Maffeis |
| 6,721,921 B1 * | 4/2004 | Altman ............... 715/210 |
| 6,732,237 B1 | 5/2004 | Jacobs et al. |
| 6,748,420 B1 | 6/2004 | Quatrano et al. |
| 6,754,884 B1 * | 6/2004 | Lucas et al. ............... 717/108 |
| 6,757,689 B2 | 6/2004 | Battas et al. |
| 6,789,054 B1 | 9/2004 | Makhlouf |
| 6,795,967 B1 | 9/2004 | Evans et al. ............... 719/310 |
| 6,799,718 B2 | 10/2004 | Chan et al. |
| 6,802,000 B1 | 10/2004 | Greene et al. ............... 713/168 |
| 6,804,686 B1 | 10/2004 | Stone et al. |
| 6,832,238 B1 | 12/2004 | Sharma et al. |
| 6,836,883 B1 | 12/2004 | Abrams et al. |
| 6,847,981 B2 | 1/2005 | Song et al. |
| 6,850,979 B1 | 2/2005 | Saulpaugh et al. |
| 6,859,180 B1 | 2/2005 | Rivera |
| 6,889,244 B1 | 5/2005 | Gaither et al. |
| 6,904,161 B1 * | 6/2005 | Becker et al. ............... 382/128 |
| 6,915,519 B2 | 7/2005 | Williamson et al. |
| 6,918,084 B1 | 7/2005 | Slaughter et al. |
| 6,922,827 B2 | 7/2005 | Vasilik et al. |
| 6,959,307 B2 | 10/2005 | Apte |
| 6,963,914 B1 | 11/2005 | Breitbart et al. |
| 6,971,096 B1 * | 11/2005 | Ankireddipally et al. ..... 718/101 |
| 6,976,086 B2 | 12/2005 | Sadeghi et al. |
| 7,000,219 B2 | 2/2006 | Barrett et al. |
| 7,017,146 B2 | 3/2006 | Dellarocas et al. |
| 7,043,722 B2 * | 5/2006 | Bau, III ............... 717/151 |
| 7,051,072 B2 | 5/2006 | Stewart et al. |
| 7,054,858 B2 | 5/2006 | Sutherland |
| 7,062,718 B2 | 6/2006 | Kodosky et al. |
| 7,072,934 B2 | 7/2006 | Helgeson et al. |
| 7,073,167 B2 | 7/2006 | Iwashita |
| 7,076,772 B2 | 7/2006 | Zatloukal |
| 7,089,584 B1 | 8/2006 | Sharma |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,146,422 B1 | 12/2006 | Marlatt et al. |
| 7,155,705 B1 | 12/2006 | Hershberg et al. |
| 7,184,967 B1 * | 2/2007 | Mital et al. ............... 705/8 |
| 7,203,924 B2 * | 4/2007 | Rehof et al. ............... 717/104 |
| 7,240,331 B2 * | 7/2007 | Vion-Dury et al. ............... 717/117 |
| 7,260,599 B2 | 8/2007 | Bauch et al. |
| 7,260,818 B1 | 8/2007 | Iterum et al. |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Macready et al. |
| 2002/0035604 A1 | 3/2002 | Cohen et al. |
| 2002/0049788 A1 | 4/2002 | Lipkin et al. |
| 2002/0073236 A1 | 6/2002 | Helgeson et al. |
| 2002/0078365 A1 | 6/2002 | Burnette et al. |
| 2002/0083075 A1 | 6/2002 | Brummel et al. |
| 2002/0120685 A1 | 8/2002 | Srivastava et al. |
| 2002/0152106 A1 | 10/2002 | Stoxen et al. |
| 2002/0165936 A1 | 11/2002 | Alston et al. |
| 2002/0174178 A1 | 11/2002 | Stawikowski |
| 2002/0174241 A1 | 11/2002 | Beged-Dov et al. |
| 2002/0184610 A1 | 12/2002 | Chong et al. |
| 2002/0194267 A1 | 12/2002 | Flesner et al. |
| 2002/0194495 A1 | 12/2002 | Gladstone et al. |
| 2003/0004746 A1 | 1/2003 | Kheirolomoom et al. |
| 2003/0005181 A1 * | 1/2003 | Bau et al. ............... 709/330 |
| 2003/0014439 A1 | 1/2003 | Boughannam |
| 2003/0018665 A1 | 1/2003 | Dovin et al. |
| 2003/0018832 A1 | 1/2003 | Amirisetty et al. |
| 2003/0023957 A1 * | 1/2003 | Bau et al. ............... 717/140 |
| 2003/0028364 A1 | 2/2003 | Chan et al. |
| 2003/0041198 A1 | 2/2003 | Exton et al. |
| 2003/0043191 A1 | 3/2003 | Tinsley et al. |
| 2003/0055868 A1 | 3/2003 | Fletcher et al. |
| 2003/0055878 A1 | 3/2003 | Fletcher et al. |
| 2003/0074217 A1 | 4/2003 | Beisiegel et al. |
| 2003/0084203 A1 | 5/2003 | Yoshida et al. |
| 2003/0110117 A1 | 6/2003 | Saidenberg et al. |
| 2003/0110446 A1 | 6/2003 | Nemer |
| 2003/0126136 A1 | 7/2003 | Omoigui |
| 2003/0149791 A1 | 8/2003 | Kane et al. |
| 2003/0167358 A1 | 9/2003 | Marvin et al. |
| 2003/0196168 A1 | 10/2003 | Hu |
| 2004/0019645 A1 | 1/2004 | Goodman et al. |
| 2004/0040011 A1 * | 2/2004 | Bosworth et al. ............... 717/114 |
| 2004/0103406 A1 | 5/2004 | Patel et al. |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |

| | | |
|---|---|---|
| 2004/0260715 A1 | 12/2004 | Mongeon et al. |
| 2006/0048093 A1* | 3/2006 | Jain et al. .................. 717/104 |
| 2006/0206856 A1 | 9/2006 | Breeden et al. |

FOREIGN PATENT DOCUMENTS

| | | |
|---|---|---|
| WO | WO0029924 | 5/2000 |

OTHER PUBLICATIONS

W.M.P. van der Aalst and A. Kumar, "XML Based Schema Definition for Support of Inter-Organizational Workflow", 2000, University of Colorado and University of Eindhoven report, retrieved from: http://citeseer.ist.psu.edu/vanderaalst00xml.html.*

Didier Plaindoux, "XML Transducers in Java", May 2002, The Eleventh International World Wide Web Conference, retrieved from: http://www2002.org/CDROM/poster/132/index.html.*

Benton et al., "Interlanguage Working Without Tears: Blending SML with Java", 1999, ACM SIGPLAN Notices, vol. 34, issue 9, pp. 126-137.*

Christensen et al., "Extending Java for High-Level Web Service Construction", Mar. 2002, BRICS Tech Report, RS-02-11, retrieved from: http://www.brics.dk/RS/02/Ref/BRICS-RS-02-Ref/BRICS-RS-02-Ref.html.*

Carey et al. "Integration, Web Services Style", Dec. 2002, Bulletin of the Technical Committee on Data Engineering, pp. 17-21.*

HP, "hp application server" developer's guide, version 8.0, 1999-2001, pp. 27-81, 127, 160, 195-271.

Java™ Debug Interface, definitions, retrieved from <URL http://java.sun.com/j2se/1.4.2/docs/guide/jpda/jdi/overview-summary.html, Feb. 21, 2007.

Kilgore, "Multi-Language, Open-Source Modeling Using the Microsoft Architecture", Simulation Conference, 2002, Proceedings of the Winter, Dec. 8-11, 2002, vol. 1, pp. 629-633.

Embury et al., "Assisting the Comprehension of Legacy Transaction", Reverse Engineering, 2001, Proceedings, Eighth Working Conference on Oct. 2-5, 2001, pp. 345-354.

Mays et al., "A Persistent Store for Large Shared Knowledge Bases", Knowledge and Data Engineering, IEEE Transactions on vol. 3, Issue 1, Mar. 1991, pp. 33-41.

Tang et al., "Integrating Remote Invocation and Distributed Shared State", Parallel and Distributed Processing Symposium, 2004, Proceedings, 18th International, Apr. 26-30, 2004, (10 pages).

Bugunovi, "A Programming Model for Composing Data Flow Collaborative Applications", 1999 IEEE, retrieved Apr. 10, 2007.

Sung, et al. "A Multimedia Authorizing Tool for the Internet", 1997 IEEE, pp. 304-308, retrieved Apr. 10, 2007.

Smith, et al., "Marching Towards a Software Reuse Future", ACM, Nov./Dec. 1994, pp. 62-72, retrieved Apr. 10, 2007.

Blake, Ruled-Driven Coordination Agent: "A Self-Configureable Agent Architecture for Distributed Control"; IEEE Mar. 2001, pp. 271-277.

Dahalin et al., Workflow Interoperability Using Extensible Markup Language (XML), IEEE, Jul. 2002, pp. 513-516.

Kunisetty "Workflow Modeling and simulation Using an Extensible Object-Oriented Knowledge Base Management System" Citeseer, 1996, pp. 1-60.

Van Der Aalst et al., Verification of XRL: An XML-Based Workflow Language, IEEE, Jul. 2001, pas. 427-432.

Sosnoski, "XML and Java Technologies: Data Binding, Part 1: Code Generation Approaches—JAXB and more", IBM, pp. 1-11, 2003.

Erich Liebmann et al., "Adaptive Data Dissemination and Caching for Edge Service Architectures Built with the J2EE", Mar. 2004, ACM Press, 2004 ACM Symposium on Applied Computing, pp. 1717-1724.

Chen et al., "eCo Architecture for Electronic Commerce Interoperability", Jun. 29, 1999, CommerceNet, pp. 1-107.

"Introducing Microsoft DotNet"; by ChristopheLauer, Jul. 2, 2002; http://web.archive.org/web/20020702162429/http://www.freevbcode.com/ShowCode.asp?ID=2171; pp. 1-10.

Paul, Laura Gibbone, "RosettaNet: Teaching business to work together", Oct. 1, 1999. http://www.developer.com/xml/article.php/616641.

Allamaraju et al., "Professional Java Server Programming J2EE 1.3 Edition," XP002442953 (Sep. 2001), pp. 1009-1057.

Willinik, "Meta-Compliation for C++," Dissertation for the degree of Doctor of Philosophy (Jan. 2000) University of Surrey.

Microsoft, "Microsoft .net Framework," Microsoft Corporation (2001), pp. 1-50.

Sun Microsystems, "J2EE Connector Architecture 1.0," XP002442954 (Aug. 2001), http://java.sun.com/j2ee/connector/download.html.

Muller, "Event-Oriented Dynamic Adaptation of Workflows: Model Architecture and Implementation," 2002 University of Leipzi, Germany, pp. i-iv, 1-342.

Peltz, "Web Service Observation," HP, Jan. 2003, Hewlett Packard Co., pp. 1-20.

* cited by examiner

```
/**
 * @jwf:flow flow ::
 *
 * <process>
 *   <receive name="Receive employee info" method="start"/>
 *   <parallel join-condition="AND">
 *     <branch>
 *       <perform name="Request e-mail" method="reqMail"/>
 *       <receive name="Get e-mail" method="MIS_mailReady"/>
 *       <perform name="Notify client about e-mail"
 *           method="mailNotification"/>
 *     </branch>
 *     <branch>
 *       <perform name="Request benefits" method="reqBenefits"/>
 *       <receive name="Get benefits" method="hr_benefitsReady"/>
 *       <perform name="Notify client about benefits"
 *           method="benefitsNotification"/>
 *     </branch>
 *   </parallel> *   <perform name="Reply to requestor" method="end"/>
 * </process>
 * ::
 **/
```

*Figure 2*

```
/**
 * @jwf:flow flow::
 *
 * <process name="PurchaseOrder">
 *   <receive name="Receive PO" method="getPO"/>
 *    <forEach name="processLineItems" var="lineitem"
 *       expression="getLineItems"
 *       parameters="inputPO">
 *     <perform name="Process line item" method="processOrder"/>
 *        <receive name="Handle service ack."
 *          method="orderService_sendAck"/>
 *   </forEach>
 *     <perform name="Send reply to the client" method="sendReply"/>
 * </process>
 * ::
 *
 * xquery::
 * define function getLineItems (element $po) returns element* {
 *    $po/DATAAREA/PROCESS_PO/POORDERLIN }
 * define function concat (element $x1, element $x2) returns element {
 *    $x1 + $x2 }
 * define function buildReply (element $x1) returns element {
 *    <reply>$x1</reply> }
 * ::
 **/ public class PurchaseOrder {
   public XML inputPO;
   public XML lineitem;
   /**
    * @jwf:xml-sequence
    */
   public XML poAckList;
   /**
    * @jwf:transforms
    */
   PoTransforms transforms;
   /**
    * @jws:control
    */
   public OrderProcessor orderService;
   void getPO(XML po) {
      inputPo = po;
   }
   public void processOrder() {
      orderService.processOrder(lineItem);
   }
   public void orderService_sendAck(XML ackedLine)
      throws Exception {
      poAckList = transforms.concat(poAckList, ackedLine);
   }
   public void sendReply() {
      callback.reply(transforms.buildReply(poAckList));
   }
   public Callback callback;
      public interface Callback {
      public void reply(XML ack);
   }
}
```

*Figure 3*

SYSTEMS AND METHODS EXTENDING AN EXISTING PROGRAMMING LANGUAGE WITH CONSTRUCTS

CLAIM OF PRIORITY

This application claims priority to U.S. Provisional Patent Application No. 60/450,074 filed Feb. 25, 2003, entitled "SYSTEMS AND METHODS UTILIZING A WORKFLOW DEFINITION LANGUAGE", which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. Provisional Patent Application No. 60/376,906 entitled "COLLABORATIVE BUSINESS PLUG-IN FRAMEWORK," by Mike Blevins, filed May 1, 2002;

U.S. Provisional Patent Application No. 60/377,157 entitled "SYSTEM AND METHOD FOR COLLABORATIVE BUSINESS PLUG-INS" by Mike Blevins, filed May 1, 2002.

U.S. patent application Ser. No. 10/404,552 entitled "COLLABORATIVE BUSINESS PLUG-IN FRAMEWORK," by Mike Blevins, filed Apr. 1, 2003;

U.S. patent application Ser. No. 10/404,296 entitled "SYSTEMS AND METHODS FOR COLLABORATIVE BUSINESS PLUG-INS" by Mike Blevins, filed Apr. 1, 2003;

U.S. patent application Ser. No. 10/784,375 entitled "SYSTEMS AND METHODS UTILIZING A WORKFLOW DEFINITION LANGUAGE" by Pal Takacsi-Nagy, file Feb. 23, 2004.

FIELD OF THE INVENTION

The present invention relates to workflow languages, and to the extension of programming languages.

BACKGROUND

Many businesses have adopted the concept of workflows to automate business processes. A workflow generally refers to a software component that is capable of performing a specific set of tasks. These tasks, which can include work items or other workflows, are typically connected in a way that allows the tasks to be ordered upon the completion. In a workflow, information such as files, documents, or tasks are passed between system resources according to a set of procedural rules so that the system can act upon the information.

In order to incorporate and develop workflows, several companies have developed a workflow language (WFL). Many workflow languages are simple, with each component in the WFL having one input and at least one output. The input can accept a token that triggers the component to perform the appropriate task. After completing the task, the component can generate a token that contains the result of the task. This token can be passed to any other component needing to execute a task utilizing that result.

While many of these workflow languages and workflow management systems are currently being used, each typically utilizes some amount of proprietary information. The existing workflow languages attempt to be complete programming languages, and consequently the developers end up reinventing a lot of things that popular programming languages already do. Further, it is necessary for developers to take on the time and expense to learn these new programming languages.

BRIEF SUMMARY

Systems and methods in accordance with embodiments of the present invention overcome many of the deficiencies in existing workflow languages by simply extending the syntax of an existing and popular programming language that is already familiar to developers. One such workflow language extends the JAVA programming language.

Other features, aspects, and objects of the invention can be obtained from a review of the specification, the figures, and the claims.

BRIEF DESCRIPTION OF THE DRAWINGS

FIG. 2 shows a workflow language code example for the workflow of FIG. 1.

FIG. 3 shows an example of a JAVA workflow file that can be used in accordance with embodiments of the present invention.

DETAILED DESCRIPTION

Figure 1:
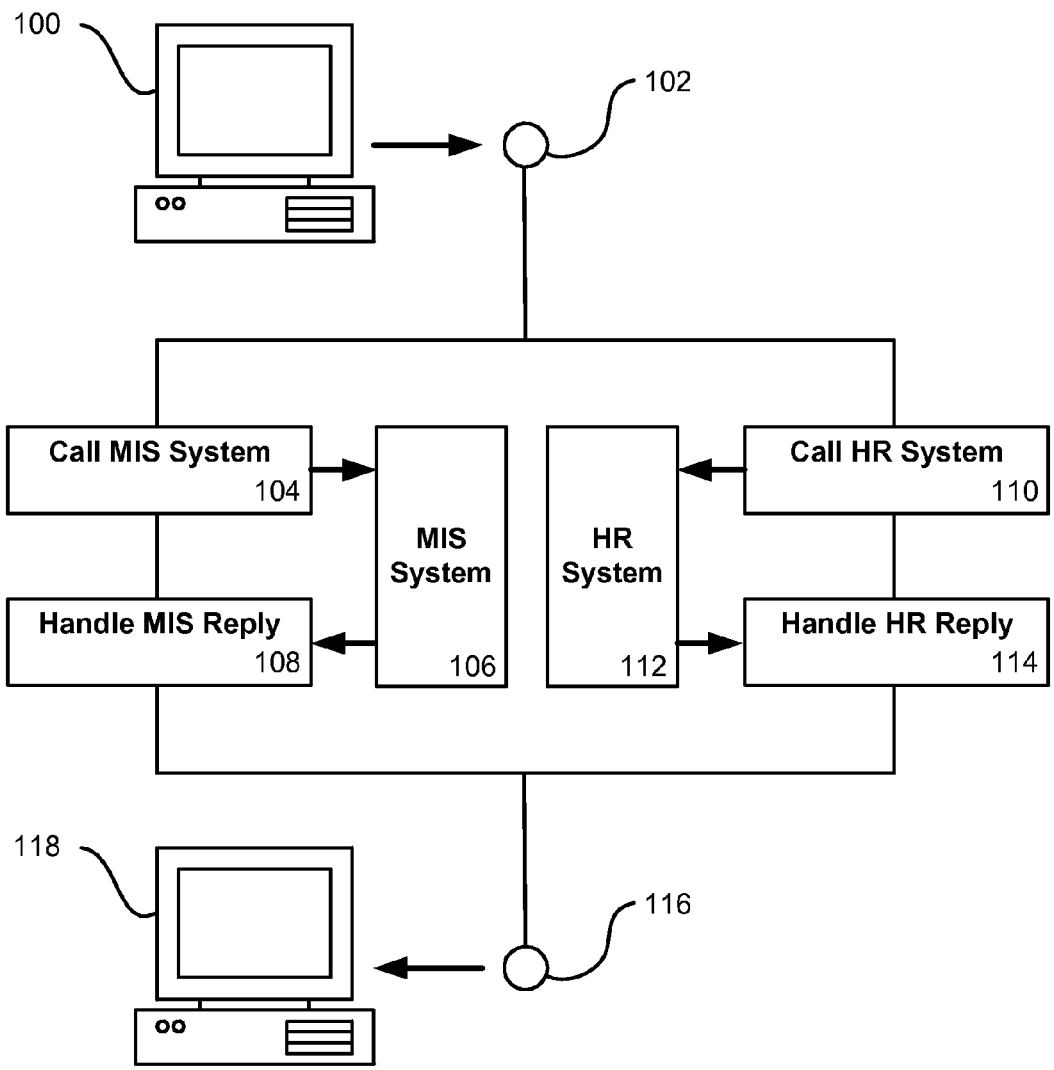
FIG. 1 is a diagram of a workflow that can be used in accordance with one embodiment of the present invention.

Systems and methods in accordance with the present invention can take advantage of users' knowledge and preference for existing programming languages by simply extending such a language. People like to use these existing languages because they already know and are familiar with them. For instance, many developers like to use JAVA (JAVA is an object oriented programming language which was developed by and is a trademark of Sun Microsystems of Santa Clara, Calif.) because they are familiar with the variables and simple procedure logic. Systems and methods in accordance with the present invention attempt to capitalize on this by simply extending JAVA with those constructs that are missing but desirable. For instance, such desirable constructs can include parallelism, asynchrony, loops over asynchronous events, and flexible handling of XML. Such constructs can allow a user to define a virtual program using the extended JAVA syntax. XML can be placed inside a JAVA class that defines the high-level orchestration logic a workflow should follow. That orchestration logic can refer to the JAVA class to carry out work, such that the logic to handle an incoming message is really in JAVA.

Languages such as have constructs such as a "while . . . do" construct and a "for" loop construct, which can each happen in a short period of time with no interruption or pause in execution. Constructs in accordance with embodiments of the present invention can happen over a long period of time, and are not limited to specific time intervals. For example, a user can utilize a loop construct to receive certain messages, but that user will typically have no control over the frequency at which messages are received. In such a situation, a system in accordance with the present invention can be set to allow a user to define a special "for" loop. This special "for" loop allows the system to receive a specified type or class of messages until a specified condition is met. The actual logic to handle the received messages, or to determine that the condition is not validated, can be done using JAVA in a way that is similar to how a user would use a normal JAVA program. By using an extended syntax and construct, the user can create such "for" loop without wasting system resources.

Another aspect to such a construct in accordance with embodiments of the present invention is that the construct cannot only execute for a long period of time, but can also "remember" what happens during that time. The construct can allow information to be processed in an efficient manner. Instead of maintaining tens of thousands of little programming objects, dormant programs can be stored away efficiently and then revived when needed. Further, such systems can handle server clusters running virtual programs that can actually "pop-up" on any machine in the cluster, further increasing resource efficiency. It may not be enough to simply revive dormant programs, as it may be necessary to revive a program in the exact state the program was in before going dormant. It can also be desirable to allow a dormant program to be revived in the proper state on any machine in the appropriate cluster.

One implementation of such a workflow language (WFL) includes a JAVA program with an appropriate extension. In order to provide the ability for an application component go dormant efficiently and then come back at a later time, a light-weight virtual machine can be used for the workflow that is able to save execution space, including the program stack and variable state, and is then able to revive the program.

The looping construct described above is just one example. In another simple example using such a workflow program, a user can write a JAVA program designating that message A and message B are to be received, followed by message C. If the messages are received in the wrong order, a workflow container can be used to handle the ordering. The container can save later messages until after the earlier messages are received and/or processed. This approach is a simple looping-style example that can be used to add ordering functionality to JAVA, which does not itself include an efficient order process.

Workflow Annotations

In one embodiment, a workflow can be defined in a JAVA Web Service (JWS) file, by placing the WFL definition to an annotation of the JAVA class of the JWS. E.g.:

```
/**
 * @jwf:flow flow::
 *
 * <process name="PurchaseOrder">
 *
 * </process>
 * ::
 **/
public class PurchaseOrder {...}
```

The name of the annotation that contains the workflow definition is jwf:flow. The JAVA methods and variables defined in the JWS file can be referenced by the flow logic.

Process can be the top-level container for workflow logic. A process can be made up of a set of activities with defined ordering. Activities can be simple, like an action or complex, like a loop. Activity types that can be supported can include, for example:

Action—a basic building block used in a workflow, which can allow a workflow to call an operation on a control, call a piece of JAVA code, or a control to call back the workflow Various loop types—can execute a set of activities multiple times depending on at least one condition Parallel—can allow for multiple parallel branches Switch—can provide a conditional branch in the workflow multiReceive—can execute input-guarded branching End—can mark the end of the workflow In addition to activities, processes can contain declarations for correlation, transactions and exceptions.

A workflow can use variables that are referred to herein as "workflow variables." Flow logic can reference variables in actions, conditions and correlations. All workflow variables can be declared in JAVA, as class variables or fields. There may be no special scoping for workflow variables, as all workflow variables can be "global" to a workflow instance. Workflow variables can be persisted along with the workflow state unless, for example, the variables are marked transient.

A special XML interface can be used to store XML content as XML (i.e. not converting to schema-influenced JAVA types). E.g.:

```
XML savedPO;
void getPO (XML po) {
  savedPO = po;
}
```

Workflow variables can be shown on a GUI canvas if the variables are of primitive JAVA types, e.g. int, Boolean, String etc. or of the XML type. Variables of other types can be still used by JAVA code inside the JAVA Work Flow (JWF) file, but may not be displayed on the GUI. The JWF can be a JAVA class with annotations that describe the flow logic, with the annotations referencing JAVA or Xquery methods within the class that implement the detailed business logic.

Controls can also be declared as JAVA class variables with special annotations, similarly to controls in a plain JWS file. E.g.:

```
/**
 * @jws:control
 */
  OrderProcessor orderService;
```

Actions

An action can be one of the basic building blocks of a process. An action can represent an atomic invocation of an operation on a control, or an invocation of local JAVA code. There can be at least four kinds of operations, such as:

incoming—the control or the "client" can call the workflow and not expect a reply or callback outgoing—the workflow can call the control and not expect a reply request/response—the workflow can call the control and expect a synchronous reply solicit/response—the control or the "client" can call the workflow and expect a synchronous reply Since JWS already provides a way to handle operation invocations and callbacks, the significance of the action construct is not to provide an additional way to do the same thing. The added value of an action construct can include the ability to allow a developer sequence, as well as to parallelize operation invocations and callbacks. Workflows can handle operations including incoming, outgoing, and request/response operations. Solicit/response type operations may not be handled by workflows, as there is no way for a workflow engine to properly sequence out-of-bound requests in this case since the invoker expects a quick, or synchronous, reply.

There can be at least two elements in a workflow language for actions, including receive and perform elements. Both of these elements can reference JAVA methods inside a JWF file that carry out work related to the action. A receive action can mark the receipt of a message that comes either via the workflow's primary interface, such as from a "client," or from a control as a callback operation. A method attribute can be used to identify the JAVA method that handles the message. The workflow engine may store the message before invoking the JAVA handler function in case the message arrives at a time when the workflow is not ready to receive the message, according to the flow logic.

In one example of using a receive tag, the workflow declares a receive action for a message from the "client":

```
<receive name="Receive PO" method="getPO"/>
...
void getPO(XML po) {
    inputPo = po;
}
```

In a second example, the receive action is used to mark a callback operation from a control. The method attribute of <receive> references a JAVA method that is defined to handle the callback operation from the control.

```
<receive name="Handle service ack."
        method="orderService_sendAck"/>
...
private void orderService_sendAck(XML ackedLine)
    throws Exception {
        poAckList = myQueries.concat(poAckList, ackedLine);
    }
```

WSDL Interface of the Workflow

A WSDL interface of a workflow can be defined by non-control callback handler methods referenced by <receive> nodes, as well as the operation on the Callback interface. The exact shape of each operation can be determined in one embodiment as follows:
- If the operation is a normal JAVA method, then the same rules can apply as for JWS, i.e. the type of the message part of the corresponding WSDL operation can be auto-generated from the JAVA signature. A notable exception can include the situation where there is jws:wsdl annotation on the class that defines all operations of the JWS.
- Another provision can include the ability to define message parts in an annotation above the operation. This can be allowed, in one instance, only when all parameters and the return type of the method are of the XML type. E.g.:

```
/**
 * @jws:operation
 * @jws:schema import="myschema.xsd"
```

```
 * @jws:return-xml schema="mytype1"
 * @jws:parameter-xml schema="mytype2"
 **/
XML foo(XML body)
```

This example defines the output message to be mytype1 and the input message to be mytype2 respectively. The schema annotation references the schema file, where these types and element are defined.

Perform

A perform tag can be used to tell the workflow engine to execute a "black box" JAVA operation that is identified by the method attribute of the tag. E.g.:

```
<perform name="Send reply to the client" method="sendReply"/>
... /**
 * @jwf:transforms
 */
POTransforms transforms;
public void sendReply( ) {
    callback.reply(transforms.buildReply(poAckList));
}
```

Starting Workflows

Workflows can be started by messages. The first activity in a workflow, such as the first child of the process tag, can be either a <receive> or a <multiReceive>. When a client invokes such an operation, a workflow instance can be started. When <multiReceive> is defined, <multiReceive> can be the first activity as well, in order to support multiple ways of starting the same workflow.

A special case of message-started workflows can involve a message broker starting a workflow as a result of a subscription. The subscription parameters can be defined by annotating the JWS operation that is invoked by the message broker, such as when the broker delivers the message. E.g.:

```
/**
 * @jws:mb-static-subscription message-topic-name="myapp.POAck"
 * filter-name="myFilter"
 * filter-value-match="myvalue"
 * filter-body="msgbody"
 **/
void foo(XML msg)
```

The jws:mb-static-subcription annotation can be used to specify the subscription parameters, such as the kind of messages that cause the message broker to start a workflow of this kind.

Decision

A decision node or activity can be used to select exactly one path of execution based on the evaluation of one or more conditions. When on a <decision> node, the workflow engine can evaluate the conditions on the enclosed <if> nodes. Execution can continue with activities inside the first <if> node, with a true condition. An optional enclosed <default> node can be executed if no other conditions are met. In the example below, the PO is approved by different people depending on the amount:

```
<decision name="Check amount>
        <if condition="vpApproval" parameters="po">
                <perform name="assign approval to VP" ... />
        </if>
        <if condition="mgrApproval" parameters="po">
                <perform name="assign approval to director" ... />
        </if>
        <default>
                <perform name="assign approval to mgr" ... />
        </default>
</decision>
...
xquery::
  define function vpApproval(element $po) returns xs:boolean {
       return $po/amount/text( ) > 5000
  }
  define function dirApproval(element $po) returns xs:boolean {
       return $po/amount/text( ) > 1000
  }
```

The condition attribute can contain a reference to a JAVA operation that returns boolean. The JAVA operation can be locally in the JWF file, can be an inlined XQuery function. If the referenced condition is an inlined XQuery function, a parameters attribute can specify the workflow variable(s) to be passed into the function identified. Multiple variables can be separated by spaces. String constants can be passed in enclosed by a single quotation mark. E.g.:
    <if condition="checkCo" parameters="lineitem,'IBM'">

Switch

A <switch> node can be used to select one path of execution, based on the value of a single expression that is associated with the node. When on a <switch> node, the workflow engine can first execute the expression, then compare the result to the values associated with the <case> nodes inside the <switch>. Execution can continue with activities inside the first <case>, with a matching value. An optional enclosed <default> node can be executed if no other conditions are met.

```
<switch name="where to send" expression="getProduct"
parameters="po" >
  <case value="widgetA">
  . <perform name="order widgetA" handler="orderA"/>
  </case>
  <case value="widgetB">
  . <perform name="order widgetB" handler="orderB"/>
  </case>
  <default>
    <perform name="throw on unknown product" ... />
  </default>
</switch>
xquery::
define function getProduct(element $po) returns string {
    return $po/product-name }
``` multiReceive

A <multiReceive> activity can provide a way to wait on multiple input events simultaneously, and to proceed on a particular branch of execution, based on which event occurred first. The children of <multiReceive> can all be <onMessage> elements. Each <onMessage> can represent an input event, as well as a branch of execution that should be taken, provided that the input event of the <onMessage> occurred first inside the enclosing <multiReceive>. The input event can be represented by a <receive> action, which can be the first activity or tag inside <onMessage>. The activities after <receive> can be the activities that are executed subsequent to the event selection. All <onMessage> tags can contain different input events. The workflow compiler can flag an error if <receive> tags referring to the same JAVA method appear as input events inside <multiReceive>. The same can be done for <parallel>. In addition to <onMessage>, <multiReceive> can have a single <onTimeout> sub-element as well, which can cause the workflow engine to generate special timeout event that is considered alongside with the regular input events.

Due to the serial nature of the workflow container, there may never be a race condition between input events. Events can be delivered one at a time to the entity bean that represents the workflow. Once the first matching event of <multiReceive> has been delivered to a workflow instance, the other input events that are potentially delivered later can be discarded, unless they are referenced later in the workflow.

In the example below, the workflow uses the <multiReceive> activity to wait for a callback from a "backend" control, a cancellation message from the client of the workflow, or for a timeout of 10 seconds. The condition or event that happens first will determine the flow of execution. In case the callback comes first, the workflow can send a message to the client, which can be referred to as the "normal" path of execution. If a "cancel" message from the workflow client arrives first, the next activity after <multiReceive> can be performed:

```
< multiReceive >
    <onMessage>
        <receive name="get availability" method="backend__
        getAvailability"/>
        <perform name="send reply to client" method="sendReply"/>
    </onMessage>
    <onMessage>
        <receive name="get cancellation" method="cancel"/>
    </onMessage>
    <onTimeout duration="P10S">
        <perform name="send error to the client" method="sendError"/>
    </onTimeout>
</ multiReceive >
<done/>
/**
* @jws:control
**/
BackendWS backend;
void backend__getAvailability(XML msg) {...}
/**
* @jws:operation
**/
void cancel( ){...}
void send Reply( ){...}
void sendError( ){...}
``` forEach

A forEach activity can perform a set of activities repeatedly, such as once for each item in a list. For instance, the example below defines a forEach activity to iterate through the line items of a purchase order.

```
<forEach variable="lineitem"
        expression=" getLineItems"
        parameters="inputPO">
    <perform name="processLine" method="processOrder"/>
    <receive name="gotAck" method="orderService__sendAck"/>
</forEach>
...
xquery::
    define function getLineItems(element $po) returns element* {
    return $po/DATAAREA/PROCESS__PO/POORDERLIN }
::
```

The expression attribute can point to a method whose return type is JAVA.util.Iterator, or to an inlined XQuery function. The variable attribute can reference a workflow variable where the current item of the iteration is stored. The parameters attribute can specify the workflow variable(s) to be passed to the JAVA operation, identified by the expression attribute. The format can be similar to the parameters attribute of <switch>.

doWhile and whileDo (loop)

A <whileDo> activity can perform the enclosed activities repeatedly, as long as the loop condition is true. The loop condition can be defined by the condition attribute of <whileDo>. This condition can be evaluated before the enclosed activities are performed, such as the activities inside <doWhile> being performed zero or many times. Similar to <switch>, the condition attribute can contain a reference to a JAVA operation that returns boolean. The JAVA operation can be locally in a JWF file, or can be an inlined XQuery function. The parameters attribute can specify the workflow variable(s) to be passed in to the JAVA operation, identified by a condition attribute. Multiple variables can be separated by spaces, and string constants can be passed that are enclosed by a single quotation mark.

In the example below, the "receive line item" action is executed as long as the "lastLine" attribute is not present in the XML document held in the lineItem variable:

```
<receive name="receive line item" method="getLineItem"/>
<whileDo condition="notLast" parameters="lineItem">
  <receive name="receive line item" method="getLineItem"/>
<whileDo/>
...
/**
 * xquery::
           * define function notLast(element $po) returns boolean {
           *    return empty($po/@lastLine) }
           *::
           */
...
/**
 * @jws:operation
 */
void getLineItem(XML x) {
    lineItem = x;
}
```

<doWhile> can be similar to <whileDo>, except that the loop condition is checked after the activities have been performed. So, the activities inside <doWhile> are performed one or many times. Below is the—modified—example that uses <doWhile> instead of <whileDo>:

```
<doWhile condition="notLast" parameters="lineItem">
    <receive name="receive line item" method="getLineItem"/>
<doWhile/>
```

Parallel

A majority of mainstream programming languages does not offer high-level abstractions for parallel execution. Writing parallel programs remains a tricky task, which can require the mastering of low-level APIs and a deep understanding of the underlying execution model. Users still can require parallel execution to increase throughput by performing tasks in parallel that are not dependent on each other. There are at least two typical cases, where parallelism helps:

Complex computations, such as matrix multiplication, where the algorithm can easily be broken into multiple independent parts. In the matrix multiplication case each element of the resultant can be computed separately, which can allow for massive parallelization.

Programs including long waits on an external resource. For example, if a program reads data from a file and then from the network, these items can be processed in parallel, such that the network read does not wait due to potential disk I/O time caused by the file read.

Workflows can be capable of utilizing the benefits of parallelism, due at least in part to the second item above. Workflows often communicate with external systems that are slow to react, so breaking up message exchanges with different systems into multiple paths of execution can be advantageous.

Parallelism Challenges

While parallel execution can bring some clear benefits, such execution can also cause additional problems for a programmer. One such problem centers on accessing shared state from multiple threads of execution. Since the threads can be part of a larger programming unit, mutual exclusion in the threads' access to shared state, such as global variables, can be a problem. A second challenge can involve synchronizing the execution of multiple threads. This can range from the simple ability to wait for termination of several threads to complexity of arbitrary inter-thread communication. High-level programming languages can contain abstractions to handle both challenges. The "synchronized" keyword in JAVA can be a mechanism to achieve mutual exclusion.

Workflows and Parallelism

As discussed above, workflows can utilize parallelism because of the common pattern that involves exchanging messages with multiple slow running systems. There can be certain important characteristics to parallel patterns in workflows:

The number of parallel branches is small (2-3).

The cross-traffic between parallel branches can be minimal, typically no shared variables and only simple synchronization: wait for termination of multiple branches.

In existing products, developers often use parallel branches of workflow to handle exceptional cases: a branch is dedicated to just waiting on a message that is only received in exceptional cases, such as a "cancel" message. In systems and methods in accordance with the present invention, there will be no need to use parallelism to handle this, as an exception handling mechanism can be used instead.

Additionally, an EJB container can serialize execution of workflow steps. What may appear to be parallel branches can in fact be only "logically" parallel, as physically the branches are going to be executed serially.

Language Syntax

A <parallel> tag can define a complex activity that consists of a number of <branch> activities, each representing parallel branches of execution. Activities that make up a branch can be placed inside a <branch> tag. There can be several branches inside a single <parallel> tag, and nesting of <parallel> tags can be supported.

For example, a "New Employee" workflow can be run every time somebody starts with the company. The HR system can be notified to get benefits arranged for the person, and the MIS web service can be invoked to enter an email address for the new employee. These systems can be loosely coupled both from each other and from the orchestrating workflow, so the flow sends them a message first with the request and they asynchronously reply, once they carried out their respective tasks. At that point the workflow can reply to the invoker that "initialization" of the employee is done. FIG. 1 shows a graphical view of the use case, as the developer might draw it. Input device 100 is coupled to workflow node 102 that starts the workflow which branches into notifying MIS System 106 and HR System 112. The MIS System 106 notifying branch consists of the activities Call MIS System 104 and Handle MIS Reply 108. The HR System 112 notifying branch consists of the activities Call HR System 110 and Handle HR Reply 114. The workflow after handling the MIS Reply 108 and HR Reply 114 finishes at the node 116 which is coupled to processing device 118. The flow language for this use case can look as shown in FIG. 2. Each branch can have access to all workflow variables at all times. In order to avoid potential problems, is can be desirable in certain systems to name global variables according to their association with a branch.

The only synchronization point between branches can be their termination point. There may be no mechanism for the branches to synchronize with each other in the middle of their execution. A join-condition attribute of a <parallel> tag can specify how branch termination can cause termination of the <parallel> activity itself. The attribute can have at least two values, including AND and OR. If the join-condition attribute is set to AND, the <parallel> activity can terminate once all of its <branch> activities have terminated. If the join-condition is set to OR, the <parallel> activity can terminate once one of its <branch> activities has terminated. Other active branches can be terminated prematurely. Since an EJB container can provide non pre-emptive scheduling of the branches, all other branches can be in a "wait" state, blocking on a <receive>, when one of the branches terminates.

Using Composition

One way to achieve mutual exclusion of variables and complex synchronization between branches is to package up the flow of the branch into a separate workflow and call that workflow as a control from the branch:

```
/**
 * @jwf:flow flow ::
 *
 * <process>
 *     <parallel>
 *         <branch>
 *             <perform name="start subflow 1" method="startBranch1"/>
 *             <receive name="wait for subflow 1 to end" method=
 *                 "br1_end"/>
 *         </branch>
 *         <branch>
 *             <perform name="start subflow 2" method="startBranch2"/>
 *             <receive name="wait for subflow 2 to end" method=
 *                 "br2_end"/>
 *         </branch>
 *     </parallel>
 *     <perform name="Reply to requestor" method="end"/>
 * </process>
 *
 **/
```

This solution can achieve mutual exclusion of variable access, since the branches can execute as separate workflows, protected by separate EJB instances. Complex synchronization, such as rendezvous, may not be possible using such a solution.

Exception Handling

Workflow exceptions can include JAVA exceptions that are not caught by JAVA handler methods. These will be referred to herein as "system exceptions." Examples of workflow exceptions can include:

Trying to use the JMS control, but the underlying JMS queue is not there.

The EJB called by the workflow throws an exception that is not handled by the JAVA handler code.

The web service called by the workflow is not reachable

An exception-handling block, or shortly block, is a piece of workflow that is enclosed inside an <block> element. For example:

```
<block onException="handleIt">
    <receive .../>
    <perform .../>
</block>
...
<exceptionHandlers>
    <exceptionHandler name="handleIt">
        <!-- actions -->
    </exceptionHandler>
</exceptionHandlers>
```

If an exception occurs inside the block, the engine can stop the normal flow of execution, and can execute the activities inside the exception handler pointed to by the onException attribute. Exception handlers are pieces of workflow that can be defined under the <exceptonHandlers> element. Exception handlers are named and can be scoped to the process. Blocks can also contain <onMessage> tags. The first child of an <onMessage> tag can be a <receive>. During the execution of activities contained inside a block, whenever a message arrives that is referenced by the <receive> tag inside <onMessage>, the workflow engine can switch to the activities inside <onMessage>.

Having performed the exception handler on an <onMessage> block, the workflow engine can execute the activities after the block. If the desired behavior is to terminate the workflow as a consequence of the exception, the exception handler can contain an abort activity. If there is no exception handler defined by the user, the engine can automatically handle the exception by simply freezing the workflow.

The exception handling behavior with respect to parallel branches can be somewhat different. Blocks may be unable to span multiple branches of <parallel>, but can contain a <parallel> block in its entirety or can just be constrained to a single branch. E.g., the following may be valid:

```
<block>
    <parallel>
        <branch>
        ...
        <branch/>
        <branch>
        ...
        <branch/>
    <parallel/>
</block>
```

If the block contains the whole <parallel> block, an exception can terminate all branches of parallel. If the block is constrained only to a single branch, then an exception occurring in that branch may not affect execution of other branches. An onException attribute on the process element can be supported that is equivalent to an implied <block> around the entire process. This can be a shorthand notation to cover perhaps 80% of the use cases. The JAVA exception that caused the last workflow exception can be retrieved using an operation such as a JwfContext.getException( ) operation. If no exception handler is specified, then <block> can be a way to persist a grouping of several nodes together for the purposes of the workflow designer GUI.

Short Running Transactions

Workflow activities can be grouped to transaction blocks. Activities inside a transaction block can be executed inside a single JTA transaction:

```
<transaction>
    <receive name="get PO from queue" .../>
    <perform name="update log" .../>
    <perform name="register PO with ERP EJB" .../>
</transaction>
```

In the above example the state of the workflow, including variables and a program counter, can be updated in the same JTA transaction as the resources that are accessed by the actions enclosed inside the <transaction>, including the message queue where the PO was read form, the log database, and finally the EJB front-ending the ERP system. If, for example, the write to the log database fails in the <perform> action, the PO message can remain in the queue.

A retryCount attribute of the <transaction> can specify how many times the workflow engine should retry to perform the activities inside the transaction. If all retry attempts have failed, the workflow engine can generate a workflow exception. Workflows can access resources via operations on controls. Some controls can support JTA transactions. If an operation on the control is called inside a JTA transaction, the work carried out inside the operation can be "infected" by the transaction. Examples of such "transactional controls" or "transactional operations" include the JMS control, the EJB control, and the DB control. The service control and its methods in general are not transactional, since the web services stack may not support transaction propagation. In case a service control operation is called via JMS "buffering", the front-end of the call can become transactional. If a non-transactional operation is called inside a transaction block, the work inside the operation may not be included in the transaction. For instance, if the transaction is rolled back, the work that has been performed by the operation can remain unaffected.

Rules for the Shape of a Transaction Block

There are certain rules that should be observed when defining transaction blocks. These can include, for example:
- a <receive> and <multiReceive> can only appear as the first activity inside a transaction block, as <receive> (and <multiReceive>) can force a transaction boundary for the workflow context. Other types of activities can appear at any position.
- transaction blocks cannot contain multiple branches of a <parallel>

Implied Transaction Blocks

If a developer does not define transaction blocks, the workflow engine can separate its execution into transactional chunks according to a simple rule, such as a rule to commit the current transaction every time, when the next activity is a <receive>, <multiReceive>, or <parallel>. If the transaction blocks cover only part of the workflow, the workflow engine can apply this simple rule for the rest of the workflow, or the "uncovered" part.

Long-Running Transactions

Workflows may often perform long running activities that can last for hours or days. Due to the long duration, it may not be possible to enclose these long-running activities in a transaction block, which can be implemented using a short running JTA transaction. To ensure atomicity in long running workflows, the developer can define sagas. Similar to transaction blocks, sagas can contain activities. One key difference between sagas and transaction blocks can include the way that aborts are handled. For transaction blocks the resource managers involved in the underlying JTA transaction can automatically undo all the work that has been done since the beginning of the transaction. This can include possible changes in the workflow state, such as values stored in workflow variables. For sagas this may not be possible, since the resource managers may not understand sagas, or long-running transactions. Therefore there can be a need for another way of undoing work, referred to herein as compensation. A logical place to define compensations can be in the transaction blocks, since a transaction block by definition constitutes an atomic unit of work. Each transactional block inside a <saga> can have a compensating section, where the compensating activities for the transaction block can be placed. Compensation can be performed if any of the enclosed transaction blocks abort. For example:

```
<saga>
    <transaction>
        <receive .../>
        <perform .../>
        <compensation>
            <!-- perform for un-perform -->
            <perform .../>
        </compensation>
    </transaction>
    <transaction>
        <perform .../>
        <compensation>
            <!-- send for un-send -->
            <perform .../>
        </compensation>
    </transaction>
</saga>
```

For sections that are not inside a transaction block, no special compensation will be done. E.g.:

```
<saga>
    <transaction>
        <receive .../>
        <perform .../>
        <compensation>
            <!-- perform for un-perform -->
            <perform .../>
        </compensation>
    </transaction>
    <perform ../>
</saga>
```

For the <perform> in the above example, no compensating action may be invoked. The compensation blocks can be performed in reverse order relative to the original execution, with the last transaction block to commit being compensated first. Compensations for transaction blocks that have been defined on parallel branches can be executed in parallel. Each compensation block can be started in a separate JTA, or short running, transaction. Compensations may not include sagas. If a workflow fails with an unhandled exception during compensation, the engine can freeze the workflow such that manual intervention from an administrator can be required.

EXAMPLES

In one example that can be used in accordance with embodiments of the present invention, the scenario involves passing in a PO to start a workflow. The workflow iterates over the line items in the PO. For each item, the workflow sends a request to a backend system. The request to the backend system includes part of the PO plus the individual line items. The replies are gathered, concatenated into a PO Acknowledgement, and sent back to the client. An example of this JWF is shown in FIG. 3.

In another example, a business process can be created to handle purchase orders. A workflow can expose a SOAP operation that accepts a purchase order asynchronously, places orders for the line items contained in the purchase order, and respond to the requestor with a purchase order reply message by performing a SOAP callback. The process can use a JWF forEach loop construct to iterate over the set of line items in the purchase order. In the underlying JWF file for the business process, the incoming purchase order is stored in an XML workflow variable and an XQuery expression is used to control the looping by enumerating each line item in turn from within the XML purchase order variable. Inside the loop, a web service call can be made to send the line item to a backend order management system, and the response can come back in the form of a web service callback. JWF can include constructs to specify such flow actions as message sending and receiving, looping, conditional branching, parallel execution, waiting for one of a possible set of messages, JAVA method invocations, and transaction and exception handling.

The line item callbacks can take a large amount of time to occur, such as hours or even days depending on the nature of the backend system. Another benefit is that the flow language can enable such applications to be easily constructed by corporate developers. A JWF runtime container can use transactions and queuing to reliably execute, sequence, and recover the individual JAVA- and/or XQuery-based workflow steps, it can handle call/callback correlation, and it can enable the application to be deactivated, such as by utilizing entity beans and persistent storage, during long periods of inactivity, even in the midst of loops in the flow. The flow description can indicate the types of messages expected by the workflow, and when those messages are expected, which can differ from the order of receipt.

Element Definitions
Process
    <process name=QName onException=>
    Content: {any activity}*
    name: the GUI label for the process
    onException: the process wide exception handler
exceptionHandlers
    <exceptionHandlers>
    Content: <exceptionHandler>+
exceptionHandler
    <exceptionHandler name=>
    Content: {any activity}*
    name: the name of this handler, referenced by <process> or <block>
    exceptionHandler cannot contain <transaction>.
done
    <done/>
    Content: empty
receive
    <receive name=QName method=QName/>
    Content: empty
    name: the GUI label for the action
    method: points to a JAVA operation inside the JWF file that will either be exposed as a client operation, or it is a control callback handler
perform
    <perform name=QName handler=QName/>
    Content: empty
    name: the GUI label for the action
    method: points to a JAVA operation inside the JWF file
decision
    <decision name=QName>
    Content: <if>+
    <if condition=parameters=>
    Content: {any activity}*
    condition: refers to a JAVA or to an inlined XQuery operation that returns boolean.
    parameters: a comma separated list of workflow variables and constants to pass to the JAVA operation, identified by the condition attribute. Constants must be in single quotes.
switch
    <switch name=expression=parameters=.>
    Content <case>+
    <case value=>
    Content: {any activity}*
    name: descriptive name for the switch node
    expression: refers to a JAVA or to an inlined XQuery operation (via jwf:queries) that returns a JAVA primitive type (String included) or a XML Schema simple type equivalent.
    value: a constant or a JAVA method, whose (return) type matches the type of the expression attribute
multiReceive
    <multiReceive>
    Content: <onMessage>+[<onTimeout>]
OnMessage
    <onMessage>
    Content: <receive>{any activity}*
onTimeout
    <onTimeout duration=>
    Content: {any activity}*
    duration: specifies how soon from the time the <choice> activity gets scheduled should
    a timeout event be raised. Uses the XML Schema "duration" data type.
forEach
    <forEach expression=variable=parameters=>
    Content: {any activity}*
    expression: an inlined Xquery function or a JAVA operation, which returns JAVA.util.Iterator
    variable: the variable to hold the value of the current iteration
    parameters: a comma separated list of workflow variables and constants to pass to the JAVA operation, identified by the expression attribute. Constants must be in single quotes.

parallel
    <parallel join-condition=>
    Content: <branch>+
    join-condition: defines when does the parallel activity terminate. If it is set to OR, the parallel activity terminates, when the first branch has terminated. If it is set to AND, the parallel activity terminates, when all the branches have been terminated.
branch
    <branch>
    Content: {any activity}*
doWhile
    <DoWhile condition=parameters>
    Content: {any activity}*
    condition: refers to a JAVA operation or an inlined XQuery function that return a boolean. In the latter case the class name should include the full package name.
    parameters: a comma separated list of workflow variables and constants to pass to the JAVA operation, identified by the condition attribute. Constants must be in single quotes.
whileDo
    <whileDo condition=parameters>
    Content: {any activity}*
    condition: refers to a JAVA operation or operation on an inlined XQuery function that return a boolean. In the latter case the class name should include the full package name.
    parameters: a comma separated list of workflow variables and constants to pass to the JAVA operation, identified by the condition attribute. Constants must be in single quotes.
block
    <block onException=>
    Content: <onMessage>*{any activity}*
    onException: the exception handlers
onMessage
    Content: <receive>{any activity}*
transaction
    <transaction timeout=retryCount=>
    Content: {any activity}+[<compensate>]
    Another <transaction> cannot be nested inside.
    timeout: the JTA transaction timeout
    retryCount: the transaction will be retried this many times
compensate
    <compensate>
    Content: {any activity}+
    Cannot contain any <saga> elements.
saga
    <saga>
    Content: {any activity}+

Business Processes

One example of a workflow language application is a workflow language for a business process manager (BPM) component. This workflow language (WFL) can define the processing rules of workflows that are executed by the BPM. The WFL can use a format such as XML format, wherein all WFL constructs are expressed as XML elements and attributes.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for extending an existing object oriented programming language, comprising the steps of:
    extending an existing object oriented programming language with a workflow language including a plurality of workflow constructs provided as markup language commands;
    selecting a program source file including a source code and classes written in the existing object oriented programming language;
    extending the source code with a workflow definition including the plurality of workflow constructs of the workflow language, wherein the workflow constructs are specified in the form of annotations to the source code and the classes, the plurality of workflow constructs including an action construct representing an activity that allows a first software component to call an operation on a second software component; and
    using a workflow program according to the workflow definition, including
        processing, using a computer including a processing device operating thereon, the action construct to allow the first software component to call the operation on the second software component, and
        passing, according to the workflow definition in the form of annotations to the source code, information selected from one or more files, documents and/or tasks between system resources, according to a set of procedural rules to generate activities at the computer as defined by the workflow definition.

2. A method according to claim 1, wherein:
    the plurality of workflow definition constructs are provided as XML commands that are then used as annotations to the source code and the classes.

3. A method according to claim 1, wherein the workflow definition is invoked by executing a software application.

4. A method according to claim 1, wherein the program source file is a Web Service file that includes the workflow definition constructs.

5. A method according to claim 4, wherein the workflow definition constructs of the Web Service file also references methods and variables for a software application running on the system and using the workflow.

6. A method according to claim 4, wherein the Web Service file includes the workflow definition constructs as a plurality of XML workflow annotations to the source code and classes defined in the Web Service file.

7. A method according to claim 6, wherein the XML workflow annotations to the source code and classes define a flow logic that references the methods and variables defined in the Web Service file.

8. A method according to claim 4, wherein workflow definitions are provided as a separate Work Flow file that includes workflow definition commands, and that are invoked by the Web Service file using the workflow definition constructs, to use the workflow as defined by the Work Flow file.

9. A method according to claim 1, further comprising a light-weight virtual machine at the computer that processes the workflow and that is enabled to, at a particular point in the workflow process, save the workflow's execution space including program stack and variable state, and, at a later point in time, revive the workflow at the same point in the workflow process using the saved program stack and variable state.

10. A method according to claim 9, wherein the light-weight virtual machine is configured to set the workflow program in a dormant condition; and
revive the dormant workflow program to its exact state before going dormant.

11. A method according to claim 1 including
a Java programming language as the program source file, wherein the Java programming language is extended by adding workflow constructs to said Java programming language, and wherein said extending further comprises embedding the workflow constructs defined by XML in the Java programming language.

12. A computer system capable of extending an existing programming language, comprising:
a computer including a processing device operating thereon;
a program source file stored on a computer readable storage medium, wherein the program source file includes a source code and classes written in an existing object oriented programming language, wherein the existing object oriented programming language is extended with a workflow language including a plurality of workflow constructs provided as markup language commands;
a workflow definition including the plurality of workflow constructs of the workflow language, wherein the workflow constructs are specified in the form of annotations to the source code and the classes, the plurality of workflow constructs including an action construct representing an activity that allows a first software component to call an operation on a second software component; and
object code executed by the processor, the object code configured to
use a workflow program according to the workflow definition, including processing, using a computer including a processing device operating thereon, the action construct to allow the first software component to call the operation on the second software component, and
pass information selected from one or more files, documents and/or tasks between system resources, according to a set of procedural rules to generate activities at the computer as defined by the workflow definition specified in the form of annotations to the source code and classes.

13. A computer system according to claim 12, wherein:
the plurality of workflow definition constructs are provided as XML commands that are then used as annotations to the source code and the classes.

14. A computer system according to claim 12, wherein the workflow definition is invoked by executing a software application.

15. A computer system according to 12, wherein the program source file is a Web Service file that includes the workflow definition constructs.

16. A computer system according to claim 15, wherein the workflow definition constructs of the Web Service file also references methods and variables for a software application running on the system and using the workflow.

17. A computer system according to claim 15, wherein the Web Service file includes the workflow definition constructs as a plurality of XML workflow annotations to the source code and classes defined in the Web Service file.

18. A computer system according to claim 17, wherein the XML workflow annotations to the source code and classes define a flow logic that can then reference the methods and variables defined in the Web Service file.

19. A computer system according to claim 15, wherein workflow definitions are provided as a separate Work Flow file that includes workflow definition commands, and that are invoked by the Web Service file using the workflow definition constructs, to use the workflow as defined by the Work Flow file.

20. A computer system according to claim 12, further comprising a light-weight virtual machine at the computer that processes the workflow and that is enabled to, at a particular point in the workflow process, save the workflow's execution space including program stack and variable state, and, at a later point in time, revive the workflow at the same point in the workflow process using the saved program stack and variable state.

21. A computer system according to claim 20, wherein the light-weight virtual machine is configured to
set the workflow program in a dormant condition; and
revive the dormant workflow program to its exact state before going dormant.

22. A computer system according to claim 12 including
a Java programming language as the program source file, wherein the Java programming language is extended by adding workflow constructs to said Java programming language, and
wherein said extending further comprises embedding the workflow constructs defined by XML in the Java programming language.

23. A computer readable storage medium including instructions stored thereon which when executed cause the computer to perform the steps of:
extending an existing object oriented programming language with a workflow language including a plurality of workflow constructs provided as markup language commands;
selecting a program source file including a source code and classes written in the existing object oriented programming language;
extending the source code with a workflow definition including the plurality of workflow constructs of the workflow language, wherein the workflow constructs are specified in the form of annotations to the source code and the classes, the plurality of workflow constructs including an action construct representing an activity that allows a first software component to call an operation on a second software component; and
using a workflow program according to the workflow definition, including
processing, using a computer including a processing device operating thereon, the action construct to allow the first software component to call the operation on the second software component, and
passing, according to the workflow definition in the form of annotations to the source code, information selected from one or more files, documents and/or tasks between system resources, according to a set of procedural rules to generate activities at the computer as defined by the workflow definition.

* * * * *